United States Patent
Xiao et al.

(10) Patent No.: US 8,941,938 B1
(45) Date of Patent: Jan. 27, 2015

(54) APPARATUS AND METHODS FOR CIRCUMFERENTIALLY ALIGNED FEATURES

(71) Applicant: Seagate Technology LLC, Cupertino, CA (US)

(72) Inventors: Shuaigang Xiao, Fremont, CA (US); XiaoMin Yang, Livermore, CA (US); David S. Kuo, Palo Alto, CA (US); Kim Y. Lee, Fremont, CA (US); Koichi Wago, Sunnyvale, CA (US); Yautzong Hsu, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/255,280

(22) Filed: Apr. 17, 2014

(51) Int. Cl.
*G11B 5/09* (2006.01)

(52) U.S. Cl.
USPC ............................... 360/48; 369/275.1

(58) Field of Classification Search
None
See application file for complete search history.

(56) References Cited

U.S. PATENT DOCUMENTS

| 7,894,155 | B2 | 2/2011 | Sakurai et al. |
| 8,475,669 | B2 | 7/2013 | Albrecht et al. |
| 2005/0094298 | A1 | 5/2005 | Sakurai et al. |
| 2006/0222899 | A1 | 10/2006 | Sugimura et al. |

OTHER PUBLICATIONS

Albrecht et al, "Bit Patterned Media at 1 Tdot/in and Beyond", IEEE Transactions on Magnetics, vol. 49, No. 2, Feb. 2013, pp. 773-778.
Wan et al, "Fabrication of templates with rectangular bits on circular tracks by combining block copolymer directed self-assembly and nanoimprint lithography", J. Micro/Nanolith. MEMS MOEMS 11(3), 031405 (Jul.-Sep. 2012) (6 pp).
Lille et al, "Integration of Servo and High Bit Aspect Ratio Data Patterns on Nanoimprint Templates for Patterned Media", IEEE Transactions on Magnetics, vol. 48, No. 11, Nov. 2012, pp. 2757-2760.
Griffiths et al, "Directed self-assembly of block copolymers for use in bit patterned media fabrication", J. Phys. D: Appl. Phys. 46 (2013) 503001 (29pp).

*Primary Examiner* — Paul Huber

(57) ABSTRACT

Provided herein is an apparatus, including a first region corresponding to a data region in a patterned recording medium; a first set of features in the first region; a second region corresponding to a servo region in a patterned recording medium; and a second set of features in the second region including rhomboidal protrusions, wherein the first set of features and the second set of features are circumferentially aligned in accordance with concentrically circular lines etched into the apparatus across the first region and the second region.

20 Claims, 7 Drawing Sheets

APPARATUS AND METHODS FOR CIRCUMFERENTIALLY ALIGNED FEATURES

BACKGROUND

Patterned recording media such as so-called hexagonal bit-patterned media ("BPM") may be fabricated by directed self-assembly ("DSA") to hexagonally arrange sphere-forming block copolymers or cylinder-forming block copolymers. Due to certain requirements of the patterned recording media and/or respective recording devices, such hexagonally arranged block copolymers may need to be skewed from symmetric hexagonal arrangements. However, asymmetric arrangements are typically limited to a skew angle of about 8 degrees. To overcome the skew angle limit, patterned recording media such as so-called rectangular BPM may be fabricated through cross imprinting. However, creation of complex servo patterns remains problematic across hexagonal and rectangular BPM. For example, it is difficult to create complex servo patterns about the natural line structures formed by lamella-forming block copolymer DSA.

SUMMARY

Provided herein is an apparatus, including a first region corresponding to a data region in a patterned recording medium; a first set of features in the first region; a second region corresponding to a servo region in a patterned recording medium; and a second set of features in the second region including rhomboidal protrusions, wherein the first set of features and the second set of features are circumferentially aligned in accordance with concentrically circular lines etched into the apparatus across the first region and the second region.

These and other features and/or aspects of the concepts provided herein may be better understood with reference to the following drawings, description, and appended claims.

DRAWINGS

Figure 1A:
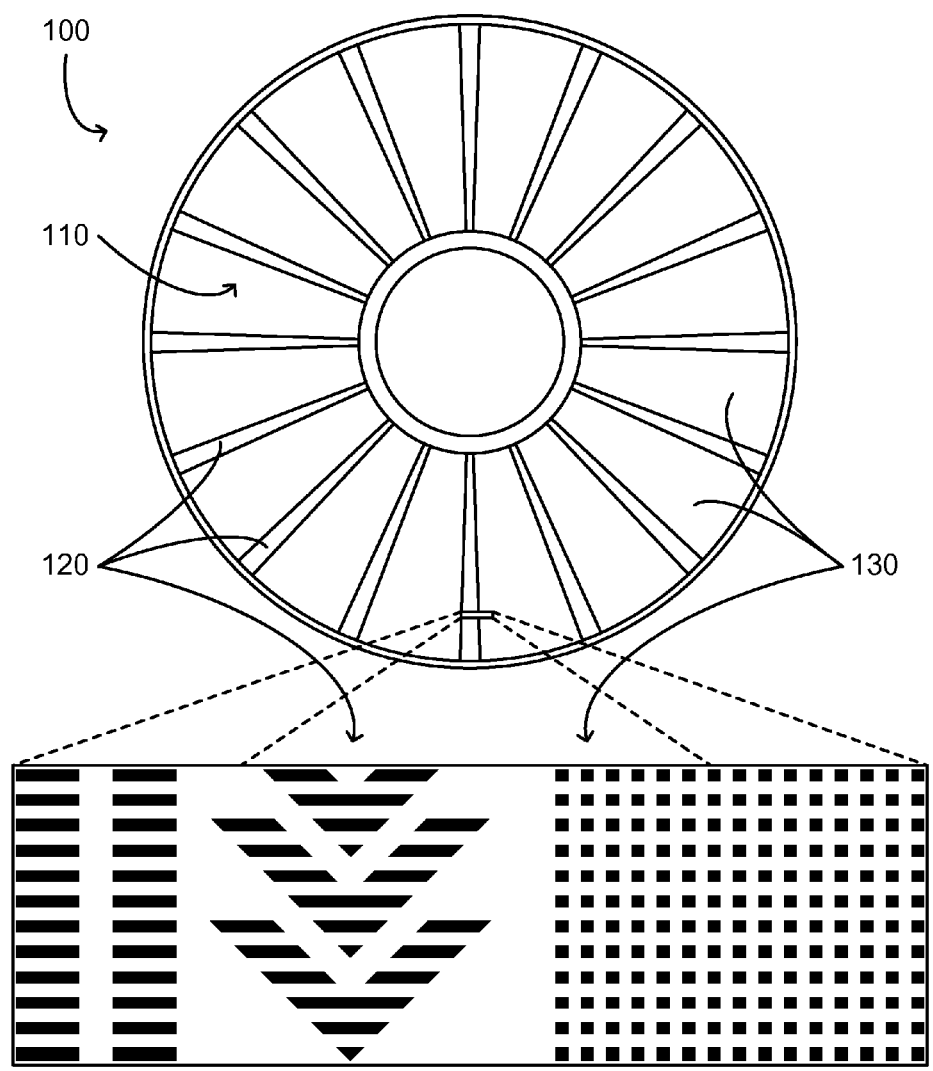

FIG. 1A provides a schematic illustrating a template for a patterned recording medium according to one aspect.

Figure 1B:
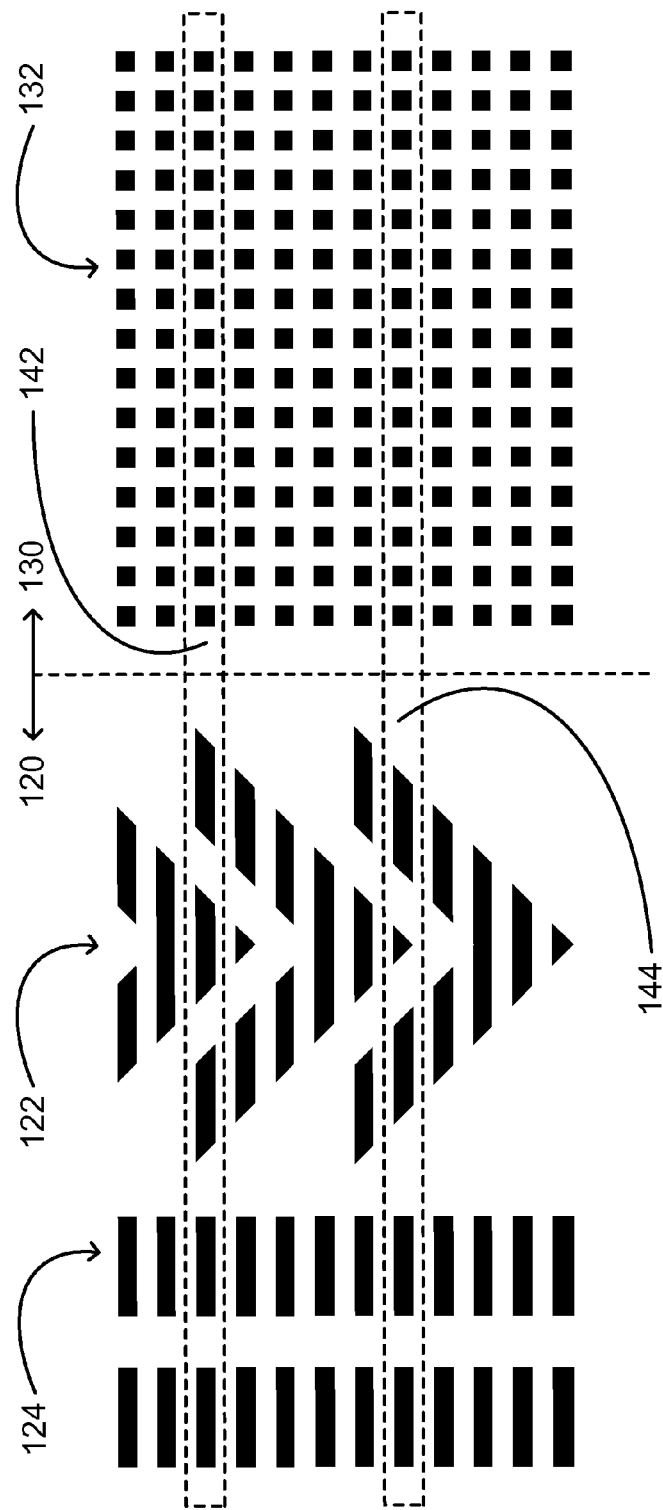

FIG. 1B provides a schematic illustrating a portion of the template in FIG. 1A according to one aspect.

Figure 2A:
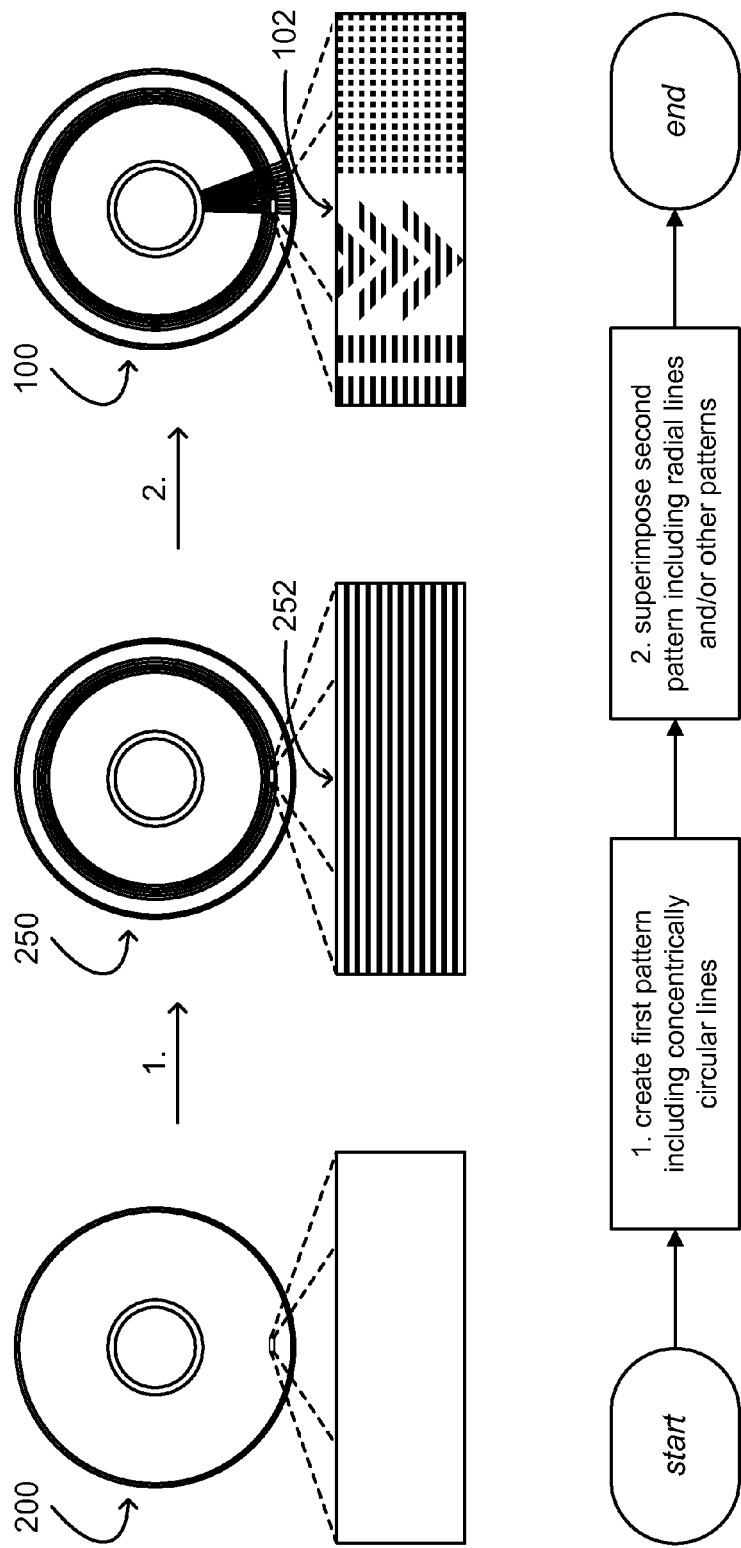

FIG. 2A provides a schematic illustrating template fabrication according to one aspect.

Figure 2B:
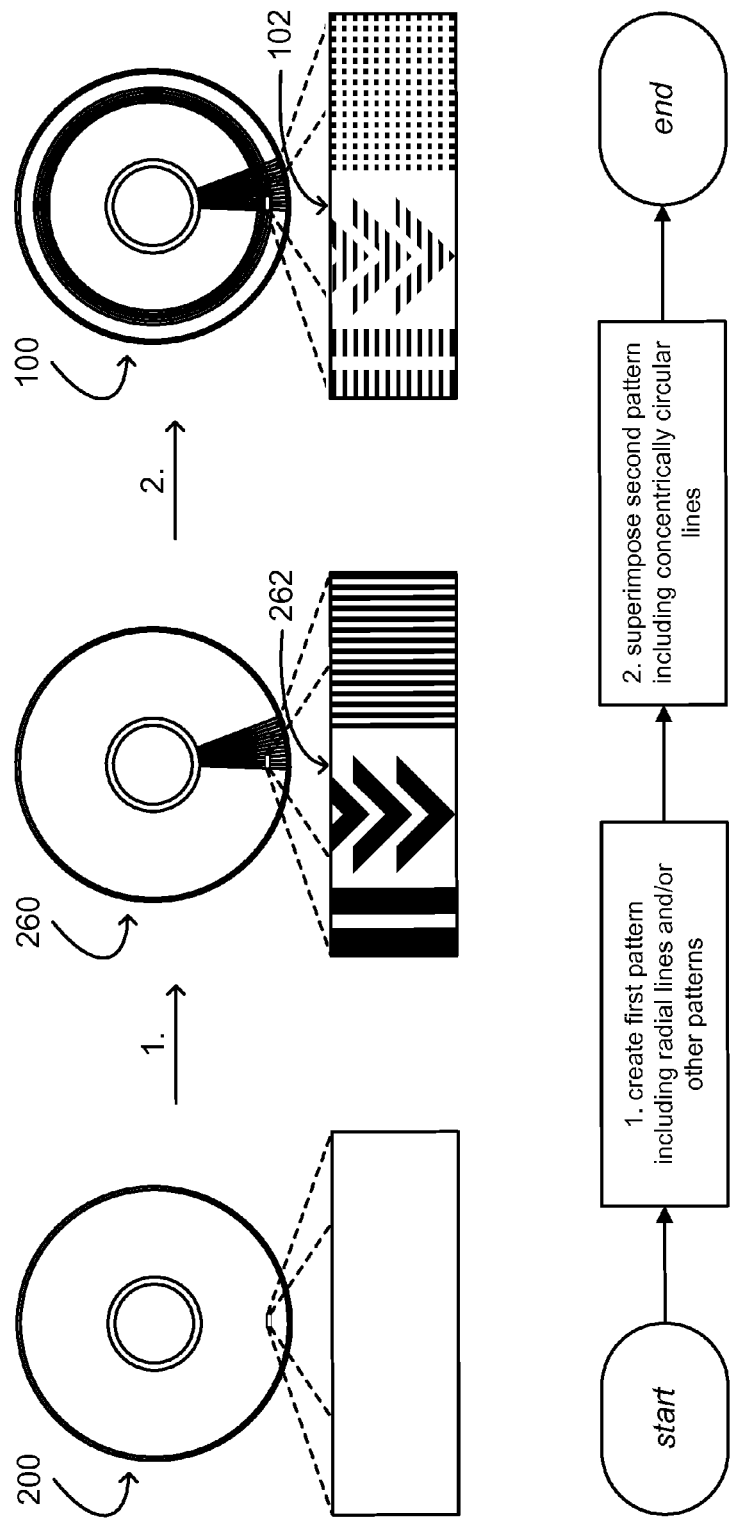

FIG. 2B provides a schematic illustrating template fabrication according to one aspect.

Figure 3:
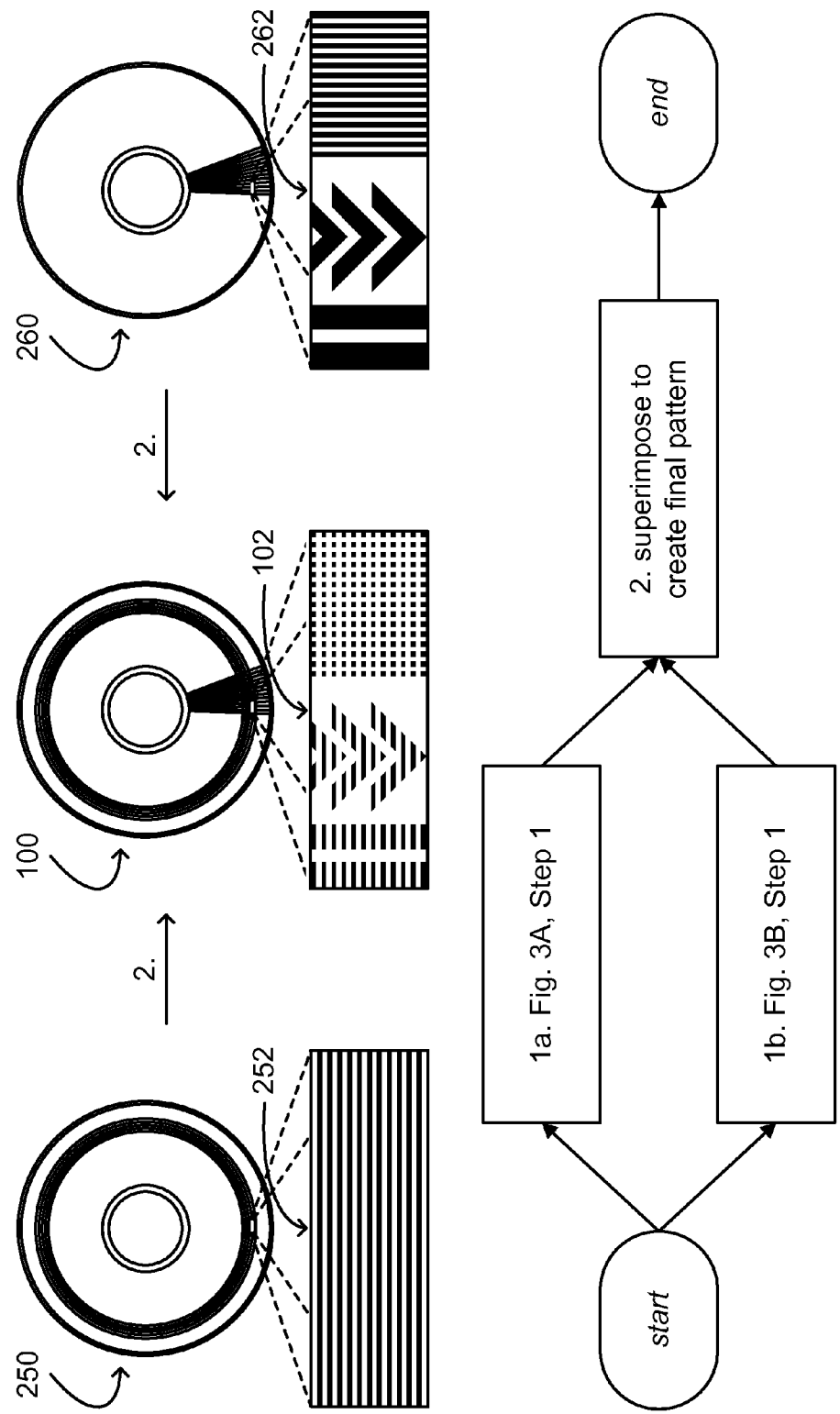

FIG. 3 provides a schematic illustrating template fabrication according to one aspect.

Figure 4A:
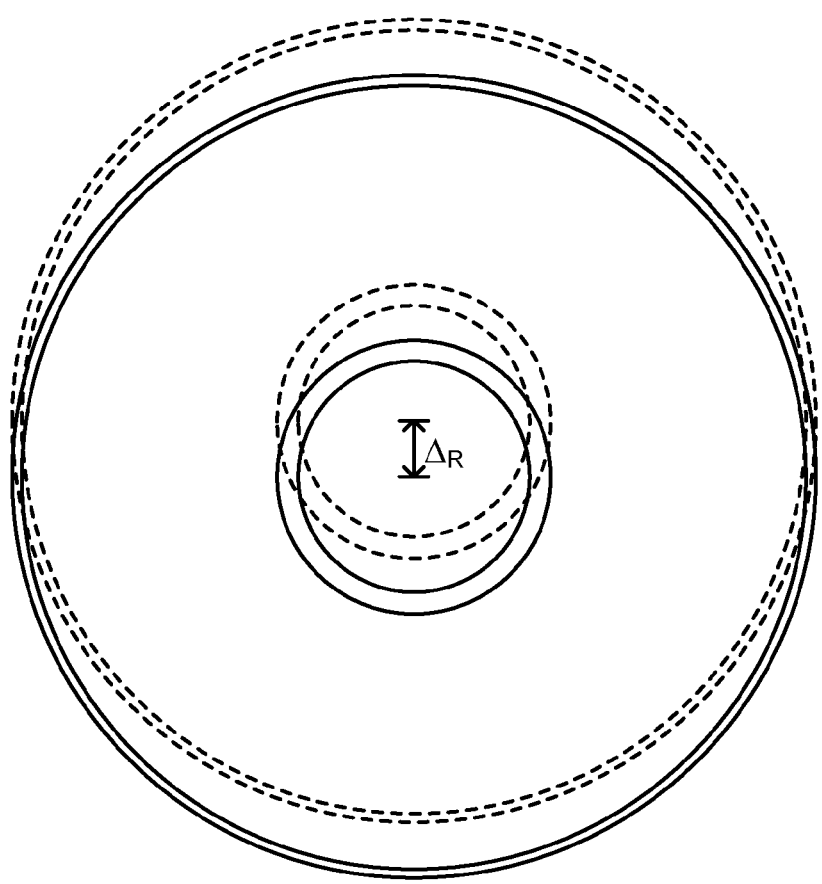

FIG. 4A provides a schematic illustrating radial displacement in template fabrication according to one aspect.

Figure 4B:
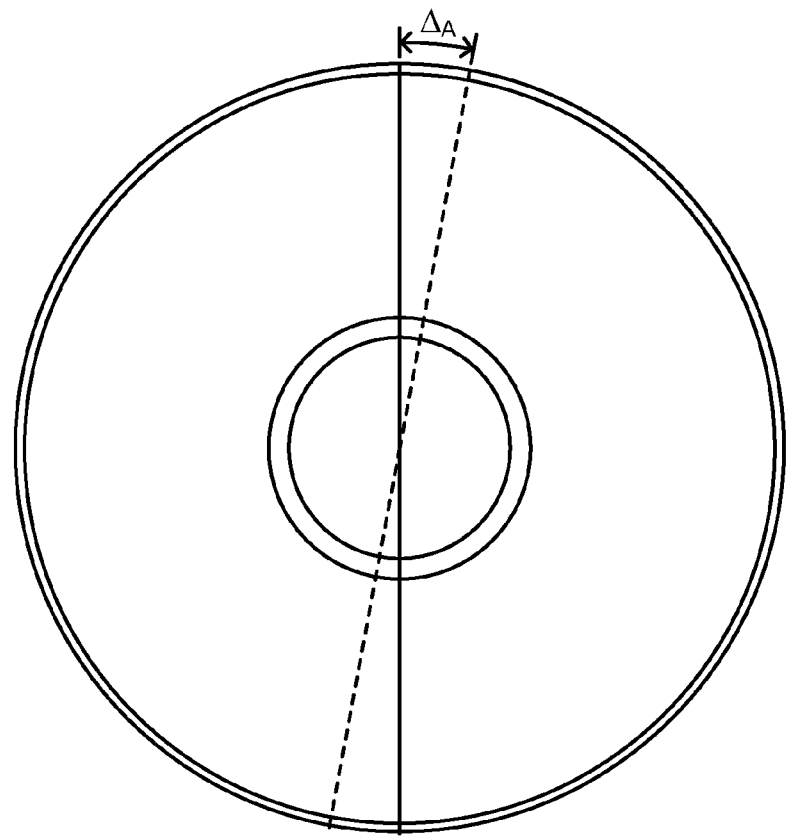

FIG. 4B provides a schematic illustrating angular displacement in template fabrication according to one aspect.

DESCRIPTION

Before some particular embodiments are illustrated and/or described in greater detail, it should be understood by persons having ordinary skill in the art that the particular embodiments do not limit the scope of the concepts provided herein, as features of such particular embodiments may vary. It should likewise be understood that a particular embodiment has features that may be readily separated from the particular embodiment and optionally combined with or substituted for features of any of a number of other embodiments illustrated and/or provided herein.

It should also be understood by persons having ordinary skill in the art that the terminology used herein is for the purpose of describing some particular embodiments, and the terminology does not limit the scope of the concepts provided herein. Unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It should be understood that while a template for a patterned recording medium may be described herein, features of the template may directly correspond to the features of the patterned recording medium. It should also be understood that features of the patterned recording medium may be described herein, and that the features of the patterned recording medium may directly correspond to the features of the template. For example, features described in reference to protrusions in the template may directly correspond to magnetic features in the patterned recording medium.

Unless defined otherwise, all technical and scientific terms used herein have the same meaning as commonly understood by persons of ordinary skill in the art.

Patterned recording media such as hexagonal bit-patterned media BPM may be fabricated by DSA to hexagonally arrange sphere-forming block copolymers or cylinder-forming block copolymers. Due to certain requirements of the patterned recording media and/or respective recording devices, such hexagonally arranged block copolymers may need to be skewed from symmetric hexagonal arrangements. However, asymmetric arrangements are typically limited to a skew angle of about 8 degrees. To overcome the skew angle limit, patterned recording media such as rectangular BPM may be fabricated through cross imprinting. However, creation of complex servo patterns remains problematic across hexagonal and rectangular BPM. For example, it is difficult to create complex servo patterns about the natural line structures formed by lamella-forming block copolymer DSA. Provided herein are apparatus including servo patterns patterned therein and methods related thereto.

FIG. 1A provides a non-limiting example of a template 100 corresponding to a patterned recording medium including servo patterns patterned therein. The template may include a template (e.g., microimprint template, nanoimprint template, etc.) for any recording medium to which lithographic (e.g., microlithographic, nanolithographic, etc.) patterning may be applied or extended. As such, the template may include, but is not limited to, a template for a longitudinal magnetic recording medium ("LMR"), a template for a perpendicular magnetic recording medium ("PMR"), a template for a heat-assisted magnetic recording medium ("HAMR"), a template for a discrete track recording medium ("DTR"), and a template for a bit-patterned medium (also "BPM"). In some embodiments, for example, the template may include a template for a BPM such as a rectangular BPM. It should be understood that the template of FIG. 1A is a schematic provided to aid understanding. As such, the template of FIG. 1A is illustrated without certain features such as features corresponding to zones for zoned bit recording in the patterned recording medium.

FIG. 1A provides a non-limiting example of a template 100 corresponding to a patterned recording medium including a servo scheme 110 patterned therein. The servo patterns may be part of any servo scheme. As such, the servo scheme may include, but is not limited to, a wedge servo scheme, an embedded servo scheme, and a dedicated servo scheme. In some embodiments, for example, the servo patterns may be part of an embedded servo scheme such as the embedded servo scheme of FIG. 1A. Because the template of FIG. 1A is a schematic without certain features such as features corresponding to zones for zoned bit recording in the patterned recording medium, it should also be understood that the servo scheme is not limited to the layout of FIG. 1A. The servo scheme of FIG. 1A, or any other servo scheme for the patterned recording medium, including, but not limited to the foregoing, may have a layout in accordance with zone bit recording.

FIG. 1A provides a non-limiting example of a template 100 corresponding to a patterned recording medium including servo regions or servo sectors 120 alternately arranged with data regions or data sectors 130 patterned therein. The servo sectors may include any servo sector fields necessary to support servo functions of the recording device in which the patterned recording medium corresponding to the template is used. As such, the servo sector fields may include, but are not limited to, one or more servo sector fields selected from a sync field including a phase-lock loop ("PLL"), an adaptive gain control ("AGC"), and/or a preamble; a servo address mark ("SAM") or servo index mark ("SIM") field; a Gray-coded track identification field; and a position error signal ("PES") burst pattern field. In some embodiments, for example, the servo sectors may include the PES burst pattern field of FIG. 1A, which PES burst pattern field is illustrated as patterned chevrons. In some embodiments, for example, the servo sectors may include the SAM or SIM field of FIG. 1A, which SAM or SIM field is illustrated as patterned radial lines.

FIG. 1B provides a non-limiting example of a portion of the template 100 of FIG. 1A corresponding to a portion of a patterned recording medium including servo sectors 120 patterned therein. While the servo sectors may include any recording device-necessitated servo sector fields, a PES burst pattern field 122 and a SAM field 124 are illustrated in FIG. 1B as an example. The PES burst pattern field may include any of a number of patterned features, including, but not limited to, patterned chevrons, one of which is illustrated in FIG. 1B inclusively between tracks 142 and 144. The patterned chevrons may include any of a number of different protrusions, including, but not limited to, one or more protrusions selected from triangular protrusions, rhomboidal protrusions, and trapezoidal protrusions. For example, track 142 includes rhomboidal protrusions and trapezoidal protrusions in the PES burst pattern field, and track 144 includes triangular protrusions and rhomboidal protrusions in the PES burst pattern field. The SAM field may include any of a number of patterned features, including, but not limited to, patterned radial lines, two of which are illustrated in FIG. 1B. The patterned radial lines may include rectangular protrusions. For example, track 142 includes two rectangular protrusions in the SAM field, one rectangular protrusion each for the patterned radial lines illustrated in FIG. 2B.

The protrusions of a servo sector and/or the one or more servo sector fields thereof may be circumferentially aligned in accordance with one or more methods of fabrication provided herein. For example, track 142 includes rhomboidal protrusions and trapezoidal protrusions in the PES burst pattern field, and track 142 includes rectangular protrusions in the SAM field, all of which protrusions are circumferentially aligned along track 142. For example, track 144 includes triangular protrusions and rhomboidal protrusions in the PES burst pattern field, and track 144 includes rectangular protrusions in the SAM field, all of which protrusions are circumferentially aligned along track 144.

The protrusions of a servo sector may be dimensioned such that the corresponding magnetic features in the patterned recording medium are thermally stable. Accordingly, single magnetic domains corresponding to the magnetic features in the patterned recording medium may be thermally stable to reversal and/or to splitting into smaller magnetic domains under normal operating conditions for the patterned recording medium in a recording device. In some embodiments, for example, the protrusions of a servo sector may be about 10 nm in a minor dimension or a cross-track direction. In some embodiments, for example, the protrusions of a servo sector may be no more than about 100 nm, 90 nm, 80 nm, 70 nm, 60 nm, 50 nm, 40 nm, 30 nm, 20 nm, or 10 nm in a major dimension or a down-track direction. Combinations of the foregoing may be used to describe the dimensions of the protrusions of a servo sector. In some embodiments, for example, the protrusions of a servo sector may be about 10 nm in a minor dimension and no more than about 100 nm in a major dimension, including about 10 nm in a minor dimension and no more than about 80 nm in a major dimension, including about 10 nm in a minor dimension and no more than about 60 nm in a major dimension, including about 10 nm in a minor dimension and no more than about 40 nm in a major dimension, and including about 10 nm in a minor dimension and no more than about 20 nm in a major dimension.

FIG. 1B provides a non-limiting example of a portion of the template 100 of FIG. 1A corresponding to a portion of a patterned recording medium including data sectors 130 patterned therein. While the data sectors may include any arrangement of protrusions, a pseudo-rectangular array or rectangular array of protrusions 132 consistent with the magnetic features of rectangular BPM is illustrated in FIG. 1B as an example. The rectangular array of protrusions may include any of a number of different protrusions, including, but not limited to, rectangular protrusions, which include square protrusions. For example, track 142 in FIG. 2B includes a number of such rectangular protrusions, one rectangular protrusion for each patterned radial line in the rectangular array of protrusions.

The protrusions of a data sector may be circumferentially aligned in accordance with one or more methods of fabrication provided herein. For example, track 142 includes rectangular protrusions, all of which protrusions are circumferentially aligned along track 142. For example, track 144 includes rectangular protrusions, all of which protrusions are circumferentially aligned along track 144.

The protrusions of a data sector may be dimensioned such that the corresponding magnetic features in the patterned recording medium may have a bit aspect ratio ("BAR") between about 1 and 4, wherein the BAR is a ratio of dimensions corresponding to a ratio of a major dimension or a down-track direction to a minor dimension or a cross-track direction. In some embodiments, for example, the protrusions of a data sector may be dimensioned such that the corresponding magnetic features in the patterned recording medium may have a BAR between about 1 and 4, including a BAR between about 1 and 3, and including a BAR between about 1 and 2. Such as BAR is favorable to both fabrication of read-write heads for recording devices and fabrication of templates in accordance with one or more methods provided herein. In some embodiments, for example, the protrusions of a data sector may be about 10 nm in a minor dimension or a cross-track direction. In some embodiments, for example, the protrusions of a data sector may be no more than about 40 nm, 30 nm, 20 nm, or 10 nm in a major dimension or a down-track direction. Combinations of the foregoing may be used to describe the dimensions of the protrusions of a data sector. In some embodiments, for example, the protrusions of a data sector may be about 10 nm in a minor dimension and no more than about 40 nm in a major dimension, including about 10 nm in a minor dimension and no more than about 30 nm in a major dimension, including about 10 nm in a minor dimension and no more than about 20 nm in a major dimension, and including about 10 nm in a minor dimension and no more than about 10 nm in a major dimension.

A data sector may be regular with respect to the pattern of protrusions. For example, the rectangular array of protrusions 132 in FIG. 2B has regularly repeating rectangular protrusions in each of the cross-track and down-track directions. Comparatively, a servo sector may be irregular with respect to the pattern of protrusions. The irregular pattern of protrusions in the servo sector may include different protrusions within a servo sector field and/or different protrusions in the cross-track direction. For example, the protrusions in the PES burst pattern field 122 of FIG. 1B include triangular protrusions, rhomboidal protrusions, and trapezoidal protrusions. The irregular pattern of protrusions in the servo sector may include different protrusions between servo sector fields and/or different protrusions in the down-track direction. For example, the protrusions in the PES burst pattern field 122 of FIG. 1B include triangular protrusions, rhomboidal protrusions, and trapezoidal protrusions, while the protrusions in the SAM field 124 include rectangular protrusions.

A data sector may be dense with respect to the number of protrusions per unit area and/or the total surface area of protrusions per unit area. Comparatively, a servo sector may be sparse with respect to the number of protrusions per unit area and/or the total surface area of protrusions per unit area. For example, the number of protrusions in the data sector 130 in FIG. 1B is greater than the number of protrusions in the servo sector 120 for about the same unit area.

A data sector and/or the protrusions therein may be circumferentially aligned with a servo sector and/or the protrusions therein in accordance with one or more methods of fabrication provided herein. For example, track 142 in FIG. 1B includes a number of rectangular protrusions in the data sector 130 and a number of rhomboidal protrusions, trapezoidal protrusions, and rectangular protrusions in the servo sector 120, all of which protrusions are circumferentially aligned along track 142. For example, track 144 in FIG. 1B includes a number of rectangular protrusions in the data sector 130 and a number of rhomboidal protrusions, triangular protrusions, and rectangular protrusions in the servo sector 120, all of which protrusions are circumferentially aligned along track 144.

FIG. 2A provides a non-limiting example of template fabrication for a patterned recording medium including servo patterns patterned therein. In a first step, a first pattern 252 of relatively high resolution may be created on a substrate 200 to provide a sub-template 250 including the first pattern 252. In a second step, a second pattern 262 (see FIG. 2B) of relatively high resolution in nascent data sectors and relatively low resolution in nascent servo sectors may be created on the sub-template 250 to provide the template 100 including a superimposed pattern 102, wherein the superimposed pattern 102 is characteristic of the superimposition of the second pattern 262 on the first pattern 252. As described herein, superimposition of the second pattern 262 on the first pattern 252 creates circumferentially aligned protrusions of different dimensions across the template. While not shown in FIG. 2A, the template may be subsequently used to fabricate patterned recording media such as BPM (e.g., rectangular BPM) by nanoimprint lithography ("NIL"). Accordingly, the circumferentially aligned protrusions across the template correspond to magnetic features across data sectors and servo sectors of subsequently fabricated patterned recording media, which provides self-registration of tracks across the data sectors and the servo sectors obviating any discovery process, unless desired.

FIG. 2B provides a non-limiting example of template fabrication for a patterned recording medium including servo patterns patterned therein. In a first step, a first pattern 262 of relatively high resolution in nascent data sectors and relatively low resolution in nascent servo sectors may be created on a substrate 200 to provide a sub-template 260 including the first pattern 262. In a second step, a second pattern 252 (see FIG. 2A) of relatively high resolution may be created on the sub-template 260 to provide the template 100 including a superimposed pattern 102, wherein the superimposed pattern 102 is characteristic of the superimposition of the second pattern 252 on the first pattern 262. As described herein, superimposition of the second pattern 252 on the first pattern 262 creates circumferentially aligned protrusions of different dimensions across the template. While not shown in FIG. 2B, the template may be subsequently used to fabricate patterned recording media such as BPM (e.g., rectangular BPM) by NIL. Accordingly, the circumferentially aligned protrusions across the template correspond to magnetic features across data sectors and servo sectors of subsequently fabricated patterned recording media, which provides self-registration of tracks across the data sectors and the servo sectors obviating any discovery process, unless desired.

FIG. 3 provides a non-limiting example of template fabrication for a patterned recording medium including servo patterns patterned therein. In a first part of a first step, a first pattern 252 of relatively high resolution may be created on a substrate 200 to provide a sub-template 250 including the first pattern 252. In a second part of a first step, a second pattern 262 of relatively high resolution in nascent data sectors and relatively low resolution in nascent servo sectors may be created on a different substrate 200 to provide a sub-template 260 including the first pattern 262. In a second step, the first pattern 252 and the second pattern 262 may be superimposed on a different substrate 200 to provide template 100 including superimposed pattern 102 by cross imprinting (e.g., cross NIL) the sub-template 250 and the sub-template 260. As described herein, superimposition of the first pattern 252 on the second pattern 262 creates circumferentially aligned protrusions of different dimensions across the template. While not shown in FIG. 3, the template may be subsequently used to fabricate patterned recording media such as BPM (e.g., rectangular BPM) by NIL. Accordingly, the circumferentially aligned protrusions across the template correspond to magnetic features across data sectors and servo sectors of subsequently fabricated patterned recording media, which provides self-registration of tracks across the data sectors and the servo sectors obviating any discovery process, unless desired.

The pattern 252 described in reference to FIG. 2A (e.g., the first pattern 252), FIG. 2B (e.g., the second pattern 252), and FIG. 3 (e.g., the first pattern 252) may include concentrically circular lines of relatively high resolution traversing nascent data sectors and servo sectors as illustrated in FIGS. 2A and 3. However, only a portion of the pattern is illustrated in FIGS. 2A and 3. It should be understood that the pattern may extend from an inner diameter of the template to an outer diameter of the template in accordance with the data sectors and the servo sectors of the patterned recording media to which the template corresponds.

The concentrically circular lines of the pattern 252 in FIGS. 2A and 3 may be of a width and pitch to provide the template with protrusions dimensioned as provided herein. Indeed, different sub-templates (e.g., 250a, 250b, 250c, . . . , 250n, wherein n indicates the nth sub-template), each including concentrically circular lines with a different width and pitch, may be used to control the dimensions of the protrusions in the template, and, ultimately, the BAR of the magnetic features in corresponding patterned recording media. Such control is favorable for simultaneously optimizing different designs for fabrication of read-write heads for recording devices and fabrication of templates.

Any of a number of methods may be used to fabricate the concentrically circular lines of the pattern 252 in FIGS. 2A and 3, including, but not limited to, electron-beam lithography, interference lithography, photolithography, imprint lithography, or a combination thereof, optionally in combination with DSA, multiple patterning (e.g., double patterning), or a combination thereof. In some embodiments, for example, the concentrically circular lines may be fabricated using electron-beam lithography to establish a chemical pre-pattern (e.g., a binary pattern of regions with different wettability) in combination with lamella-forming block copolymer DSA.

The pattern 262 described in reference to FIG. 2A (e.g., the second pattern 262), FIG. 2B (e.g., the first pattern 262), and FIG. 3 (e.g., the second pattern 262) may include radial lines of relatively high resolution traversing nascent data sectors and wider radial lines (also with larger pitch) and chevrons of relatively low resolution traversing nascent servo sectors as illustrated in FIGS. 2B and 3. However, only a portion of the pattern is illustrated in FIGS. 2B and 3. It should be understood that the pattern may annularly extend around the template in accordance with the data sectors and the servo sectors of the patterned recording media to which the template corresponds.

The radial lines and the chevrons of the pattern 262 in FIGS. 2B and 3 may be of a width and pitch to provide the template with protrusions dimensioned as provided herein. Indeed, different sub-templates (e.g., 260a, 260b, 260c, . . . , 260n, wherein n indicates the nth sub-template), each including radial lines and chevrons with a different width and pitch, may be used to control the dimensions of the protrusions in the template, and, ultimately, the BAR of the magnetic features in corresponding patterned recording media. Such control is favorable for simultaneously optimizing different designs for fabrication of read-write heads for recording devices and fabrication of templates.

Any of a number of methods may be used to fabricate the radial lines and the chevrons of the pattern 262 in FIGS. 2B and 3, including, but not limited to, electron-beam lithography, interference lithography, photolithography, imprint lithography, or a combination thereof, optionally in combination with DSA, multiple patterning (e.g., double patterning), or a combination thereof. In some embodiments, for example, the radial lines of relatively high resolution may be fabricated using electron-beam lithography to establish a chemical pre-pattern (e.g., a binary pattern of regions with different wettability) in combination with lamella-forming block copolymer DSA. In some embodiments, for example, the wider radial lines and chevrons of relatively low resolution may be fabricated using electron-beam lithography.

FIG. 4A provides a schematic illustrating radial displacement (AR) in template fabrication according to one aspect. In some embodiments, superimposing a first pattern (e.g., the pattern 252 of the sub-template 250) and a second pattern (e.g., the pattern 262 of the sub-template 260) comprises superimposing with a radial displacement no more than 100 nm, 90 nm, 80 nm, 70 nm, 60 nm, 50 nm, 40 nm, 30 nm, 20 nm, 10 nm, 5 nm, or 1 nm.

FIG. 4B provides a schematic illustrating angular displacement (AA) in template fabrication according to one aspect. In some embodiments, superimposing a first pattern (e.g., the pattern 252 of the sub-template 250) and a second pattern (e.g., the pattern 262 of the sub-template 260) comprises superimposing with an angular displacement no more than 2500 nrad, 2250 nrad, 2000 nrad, 1750 nrad, 1500 nrad, 1250 nrad, 1000 nrad, 750 nrad, 500 nrad, 250 nrad, 100 nrad, 50 nrad, or 25 nrad.

The larger the radial displacement and/or angular displacement, the more likely a discovery process for registration of tracks across the data sectors and the servo sectors in corresponding patterned recording media. However, as provided herein, the circumferentially aligned protrusions across the template correspond to magnetic features across data sectors and servo sectors of subsequently fabricated patterned recording media, which provides self-registration of tracks across the data sectors and the servo sectors obviating any discovery process.

In view of the foregoing, provided herein are non-limiting examples of template fabrication for patterned recording media including servo patterns patterned therein that do not compromise the quality of the data sectors and the magnetic features therein of the patterned recording media.

As such, provided herein is an apparatus, comprising a first region corresponding to a data region in a patterned recording medium; a first set of features in the first region; a second region corresponding to a servo region in a patterned recording medium; and a second set of features in the second region comprising rhomboidal protrusions, wherein the first set of features and the second set of features are circumferentially aligned, characteristic of concentrically circular lines etched into the apparatus across the first region and the second region. In some embodiments, the features of the first set of features are arranged in a pseudo-rectangular array. In some embodiments, the features of the first set of features are characteristic of the concentrically circular lines intersecting with radial lines etched into the apparatus across the first region. In some embodiments, the features of the first set of features comprise rectangular protrusions. In some embodiments, the features of the second set of features are characteristic of the concentrically circular lines intersecting with a combination of radial lines and chevrons etched into the apparatus across the second region. In some embodiments, the features of the second set of features comprise a combination of rectangular protrusions and rhomboidal protrusions. In some embodiments, the apparatus comprises a nanoimprint template for a patterned recording medium.

Also provided herein is a method, comprising creating a first region comprising a first set of features in a substrate corresponding to a data region in a patterned recording medium; and creating a second region comprising a second set of features in the substrate corresponding to a servo region in a patterned recording medium, wherein creating the first region and the second region comprises superimposing a first pattern comprising concentrically circular lines and a second pattern comprising a combination of radial lines and chevrons in the substrate, and wherein the first set of features and the second set of features are circumferentially aligned, characteristic of the concentrically circular lines. In some embodiments, superimposing the first pattern and the second pattern comprises superimposing with a radial displacement less than 100 nm. In some embodiments, superimposing the first pattern and the second pattern comprises superimposing with an angular displacement less than 2500 nrad. In some embodiments, the radial lines of the second pattern comprise a first set of radial lines corresponding to the first region and a second set of wider radial lines corresponding to the second region. In some embodiments, the chevrons of the second pattern correspond to the second region. In some embodiments, the first region comprises a plurality of rectangular protrusions arranged in a pseudo-rectangular array. In some embodiments, the second region comprises a plurality of rectangular protrusions and rhomboidal protrusions.

Also provided herein is a method, comprising creating a first region comprising a first set of features in a substrate corresponding to a data region in a patterned recording medium; and creating a second region comprising a second set of features in the substrate corresponding to a servo region in a patterned recording medium, wherein creating the first region and the second region comprises superimposing a first pattern comprising concentrically circular lines and a second pattern comprising chevrons in the substrate, and wherein the first set of features and the second set of features are circumferentially aligned, characteristic of the concentrically circular lines. In some embodiments, superimposing the first pattern and the second pattern comprises superimposing with a radial displacement than 10 nm. In some embodiments, superimposing the first pattern and the second pattern comprises superimposing with an angular displacement less than 25 nrad. In some embodiments, the second pattern further comprises a first set of radial lines corresponding to the first region and a second set of radial lines corresponding to the second region, wherein the second set of radial lines comprises a larger pitch than the first set of radial lines. In some embodiments, the method further comprises creating the first pattern by electron-beam lithography, interference lithography, photolithography, imprint lithography, or a combination thereof, optionally in combination with directed self-assembly, double patterning, or a combination thereof. In some embodiments, the method further comprises creating the second pattern by electron-beam lithography, interference lithography, photolithography, imprint lithography, or a combination thereof, optionally in combination with directed self-assembly, double patterning, or a combination thereof.

While some particular embodiments have been illustrated and/or described herein, and while the particular embodiments have been illustrated and/or described in some detail, it is not the intention of the applicant(s) for the particular embodiments to limit the scope of the concepts presented herein. Additional adaptations and/or modifications may readily appear to persons having ordinary skill in the art, and, in broader aspects, these adaptations and/or modifications may be encompassed as well. Accordingly, departures may be made from the particular embodiments illustrated and/or described herein without departing from the scope of the concepts provided herein. The implementations provided herein and other implementations are within the scope of the following claims.

What is claimed is:

1. An apparatus, comprising:
    a first region corresponding to a data region in a patterned recording medium;
    a first set of features in the first region;
    a second region corresponding to a servo region in a patterned recording medium; and
    a second set of features in the second region comprising rhomboidal protrusions,
        wherein the first set of features and the second set of features are circumferentially aligned in accordance with concentrically circular lines etched into the apparatus across the first region and the second region.

2. The apparatus of claim 1, wherein the features of the first set of features are arranged in a pseudo-rectangular array.

3. The apparatus of claim 1, wherein the features of the first set of features are characteristic of the concentrically circular lines intersecting with radial lines etched into the apparatus across the first region.

4. The apparatus of claim 1, wherein the features of the first set of features comprise rectangular protrusions.

5. The apparatus of claim 1, wherein the features of the second set of features are characteristic of the concentrically circular lines intersecting with a combination of radial lines and chevrons etched into the apparatus across the second region.

6. The apparatus of claim 1, wherein the features of the second set of features comprise a combination of rectangular protrusions and rhomboidal protrusions.

7. The apparatus of claim 1, wherein the apparatus comprises a nanoimprint template for a patterned recording medium.

8. A method, comprising:
    creating a first region comprising a first set of features in a substrate corresponding to a data region in a patterned recording medium; and
    creating a second region comprising a second set of features in the substrate corresponding to a servo region in a patterned recording medium,
        wherein creating the first region and the second region comprises superimposing a first pattern comprising concentrically circular lines and a second pattern comprising a combination of radial lines and chevrons in the substrate, and
        wherein the first set of features and the second set of features are circumferentially aligned in accordance with the concentrically circular lines.

9. The method of claim 8, wherein superimposing the first pattern and the second pattern comprises superimposing with a radial displacement less than 100 nm.

10. The method of claim 8, wherein superimposing the first pattern and the second pattern comprises superimposing with an angular displacement less than 2500 nrad.

11. The method of claim 8, wherein the radial lines of the second pattern comprise a first set of radial lines corresponding to the first region and a second set of wider radial lines corresponding to the second region.

12. The method of claim 8, wherein the chevrons of the second pattern correspond to the second region.

13. The method of claim 8, wherein the first region comprises a plurality of rectangular protrusions arranged in a pseudo-rectangular array.

14. The method of claim 8, wherein the second region comprises a plurality of rectangular protrusions and rhomboidal protrusions.

15. A method, comprising:

creating a first region comprising a first set of features in a substrate corresponding to a data region in a patterned recording medium; and creating a second region comprising a second set of features in the substrate corresponding to a servo region in a patterned recording medium, wherein creating the first region and the second region comprises superimposing a first pattern comprising concentrically circular lines and a second pattern comprising chevrons in the substrate, and wherein the first set of features and the second set of features are circumferentially aligned in accordance with the concentrically circular lines.

16. The method of claim 15, wherein superimposing the first pattern and the second pattern comprises superimposing with a radial displacement than 10 nm.

17. The method of claim 15, wherein superimposing the first pattern and the second pattern comprises superimposing with an angular displacement less than 25 nrad.

18. The method of claim 15, wherein the second pattern further comprises a first set of radial lines corresponding to the first region and a second set of radial lines corresponding to the second region, wherein the second set of radial lines comprises a larger pitch than the first set of radial lines.

19. The method of claim 15, further comprising creating the first pattern by electron-beam lithography, interference lithography, photolithography, imprint lithography, or a combination thereof, optionally in combination with directed self-assembly, double patterning, or a combination thereof.

20. The method of claim 15, further comprising creating the second pattern by electron-beam lithography, interference lithography, photolithography, imprint lithography, or a combination thereof, optionally in combination with directed self-assembly, double patterning, or a combination thereof.

* * * * *